(12) United States Patent
Gao et al.

(10) Patent No.: US 9,184,572 B2
(45) Date of Patent: Nov. 10, 2015

(54) OVERLAP PROTECTIVE SHUTTER DEVICE FOR ELECTRICAL EQUIPMENT

(75) Inventors: Zheng Gao, Shanghai (CN); Xuhui Ren, Shanghai (CN); Wenbin Wei, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/354,162

(22) PCT Filed: Oct. 31, 2011

(86) PCT No.: PCT/CN2011/081538
§ 371 (c)(1),
(2), (4) Date: Aug. 26, 2014

(87) PCT Pub. No.: WO2013/063733
PCT Pub. Date: May 10, 2013

(65) Prior Publication Data
US 2015/0001050 A1    Jan. 1, 2015

(51) Int. Cl.
*H01R 13/447* (2006.01)
*H01H 9/22* (2006.01)
(Continued)

(52) U.S. Cl.
CPC ........................ *H02B 11/24* (2013.01)

(58) Field of Classification Search
CPC ............. H01R 13/447; H01R 13/5213; H01R 13/453; H01H 9/22; H01H 33/022; H01H 33/666; F16P 3/14; F16P 3/12; E05B 65/0003; E05B 65/025
See application file for complete search history.

(56) References Cited

U.S. PATENT DOCUMENTS

| | | | |
|---|---|---|---|
| 1,797,936 A | | 3/1931 | Auringer |
| 3,610,850 A | * | 10/1971 | Eichelberger ............. 200/50.21 |
| 3,614,350 A | * | 10/1971 | Eichelberger et al. ..... 200/50.21 |

(Continued)

FOREIGN PATENT DOCUMENTS

| | | |
|---|---|---|
| CN | 2299190 Y | 12/1998 |
| CN | 2620404 Y | 6/2004 |

(Continued)

OTHER PUBLICATIONS

PCT International Search Report from corresponding PCT International Application No. PCT/CN2011/081538, dated Aug. 16, 2012.

(Continued)

*Primary Examiner* — Gary Paumen
(74) *Attorney, Agent, or Firm* — GE Global Patent Operation; Stephen G. Midgley

(57) ABSTRACT

A protective shutter device for exposing and preventing access to electrical contacts of a switchgear. The device includes a linkage assembly coupled to the housing, the linkage assembly including a first and a second drive arm. A guide assembly is coupled to the housing, and includes a first end, a second end, and a body connecting the ends. The device further includes a first shutter coupled to the first drive arm and the body of the guide assembly. The first shutter selectively moves along the body. A second shutter is coupled to the second drive arm and the guide assembly body, the second shutter including a lower and an upper plate. The lower plate is coupled to the upper plate, wherein the plates selectively move along the body to a first position to expose the electrical contacts, and to a second position to prevent access to the electrical contacts.

20 Claims, 8 Drawing Sheets

(51) Int. Cl.
  *F16P 3/14* (2006.01)
  *H02B 11/24* (2006.01)

(56) References Cited

U.S. PATENT DOCUMENTS

| | | | | |
|---|---|---|---|---|
| 3,783,208 | A | * | 1/1974 | Davies et al. ............... 200/50.22 |
| 3,958,156 | A | * | 5/1976 | Tjebben ........................ 361/606 |
| 4,146,915 | A | | 3/1979 | Yoshida |
| 6,746,092 | B2 | | 6/2004 | Leccia |
| 2010/0089874 | A1 | | 4/2010 | Morita |

FOREIGN PATENT DOCUMENTS

| | | |
|---|---|---|
| CN | 101001003 A | 7/2007 |
| CN | 101022210 A | 8/2007 |
| CN | 201041924 Y | 3/2008 |
| CN | 201188516 Y | 1/2009 |
| CN | 201222625 Y | 4/2009 |
| CN | 101436761 A | 5/2009 |
| CN | 201303228 Y | 9/2009 |
| CN | 101789567 A | 7/2010 |
| CN | 101789657 A | 7/2010 |
| DE | 2825217 A1 | 12/1979 |
| JP | 5789311 U | 6/1982 |
| JP | 5972809 U | 5/1984 |
| JP | 6184610 U | 6/1986 |
| JP | 6336110 U | 3/1988 |

OTHER PUBLICATIONS

Bridger, "Comparison of ANSI/IEEE and IEC Requirements for Metal-Clad Switchgear", IEEE Transactions on Industry Applications, vol. 33, No. 1, Jan./Feb. 1997, pp. 216-225.

Unofficial English translation of Office Action issued in connection with corresponding JP Application No. 2014-537444 on Jun. 9, 2015.

* cited by examiner

OVERLAP PROTECTIVE SHUTTER DEVICE FOR ELECTRICAL EQUIPMENT

BACKGROUND OF THE INVENTION

The embodiments described herein relate generally to a shutter device for a switchgear housing, and more particularly, to methods and devices used to prevent access to voltage line terminals within the switchgear housing by an overlap protective shutter device.

In known construction of a switchgear housing of the draw-out type, the movable electrical contacts of a circuit breaker are mounted within insulating bushings. The insulating bushings extend into insulating tubes which are mounted in terminal apertures of the associated switchgear housing to engage fixed electrical contacts disposed in the insulating tubes. In order to protect operating and maintenance personnel who enter the switchgear housing, known shutters are used to close the openings to the insulating tubes when the circuit breaker is removed from the normal operating position.

Conventional shutters are activated by the circuit breaker moving into and out of the switchgear housing. As the circuit breaker moves into the housing, known shutters move to a position either above or below the fixed electrical contacts to expose the fixed electrical contacts. As the circuit breaker moves out of the housing to disconnect from the switchgear, known shutters move to prevent access to the electrical contacts of switchgear. Conventional shutters, however, are not sized for multi-tiered, compact switchgear configurations.

BRIEF DESCRIPTION OF THE INVENTION

In one aspect, a protective shutter device for exposing and preventing access to electrical contacts of a switchgear is provided. The device includes a linkage assembly coupled to the housing, wherein the linkage assembly includes a first drive arm and a second drive arm. A guide assembly is coupled to the housing, wherein the guide assembly includes a first end, a second end and a guide body connecting the first end and the second end. The device further includes a first shutter coupled to the first drive arm of the linkage assembly and the guide body of the guide assembly. The first shutter is configured to selectively move along the guide body. A second shutter is coupled to the second drive arm of the linkage assembly and the guide body of the guide assembly, wherein the second shutter includes a lower plate and an upper plate. The lower plate is coupled to the upper plate, wherein the lower plate and the upper plate are configured to selectively move along the guide body to a first position which is configured to expose the electrical contacts and to a second position which is configured to prevent access to the electrical contacts.

In another aspect, a switchgear device for exposing and preventing access to electrical contacts of a switchgear is provided. The device includes a housing having a top, a bottom, a sidewall and a back wall connecting together the top and the bottom. The back wall includes a plurality of terminal apertures defined there through. A linkage assembly is configured to couple to the housing, wherein the linkage assembly includes a first drive arm and a second drive arm. A guide assembly is coupled to the housing, wherein the guide assembly includes a first end, a second end and a guide body connecting the first end and the second end. The device further includes a first shutter coupled to the first drive arm of the linkage assembly and the guide body of the guide assembly. The first shutter is configured to selectively move along the guide body. A second shutter is coupled to the second drive arm of the linkage assembly and the guide body of the guide assembly, wherein the second shutter includes a lower plate and an upper plate. The lower plate is coupled to the upper plate, wherein the lower plate and the upper plate are configured to selectively move along the guide body to a first position which is configured to expose the electrical contacts and to a second position which is configured to prevent access to the electrical contacts.

DETAILED DESCRIPTION OF THE INVENTION

Figure 1:
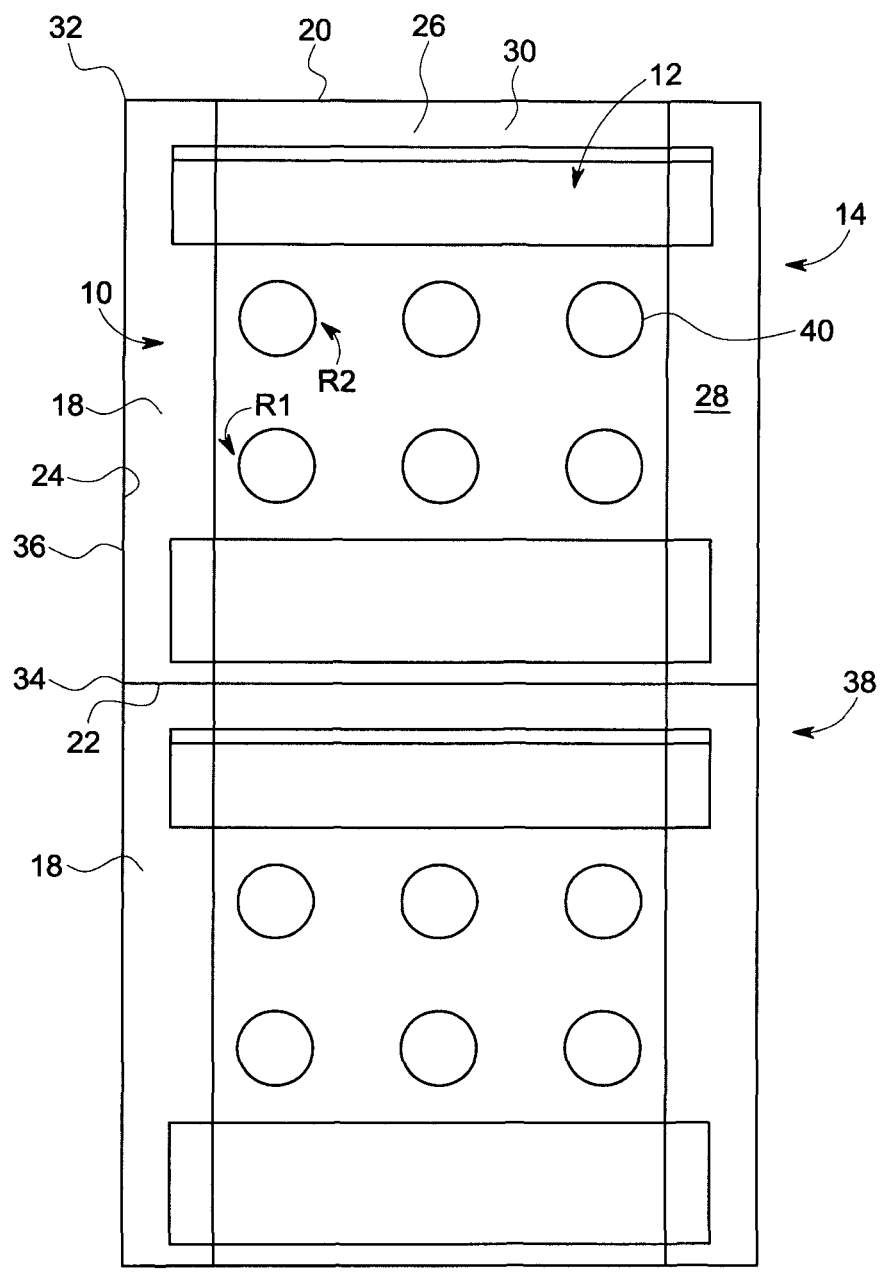
FIG. 1 illustrates a front view of a switchgear and an exemplary shutter assembly coupled to switchgear and including the shutter assembly orientated in a first position.
Figure 2:
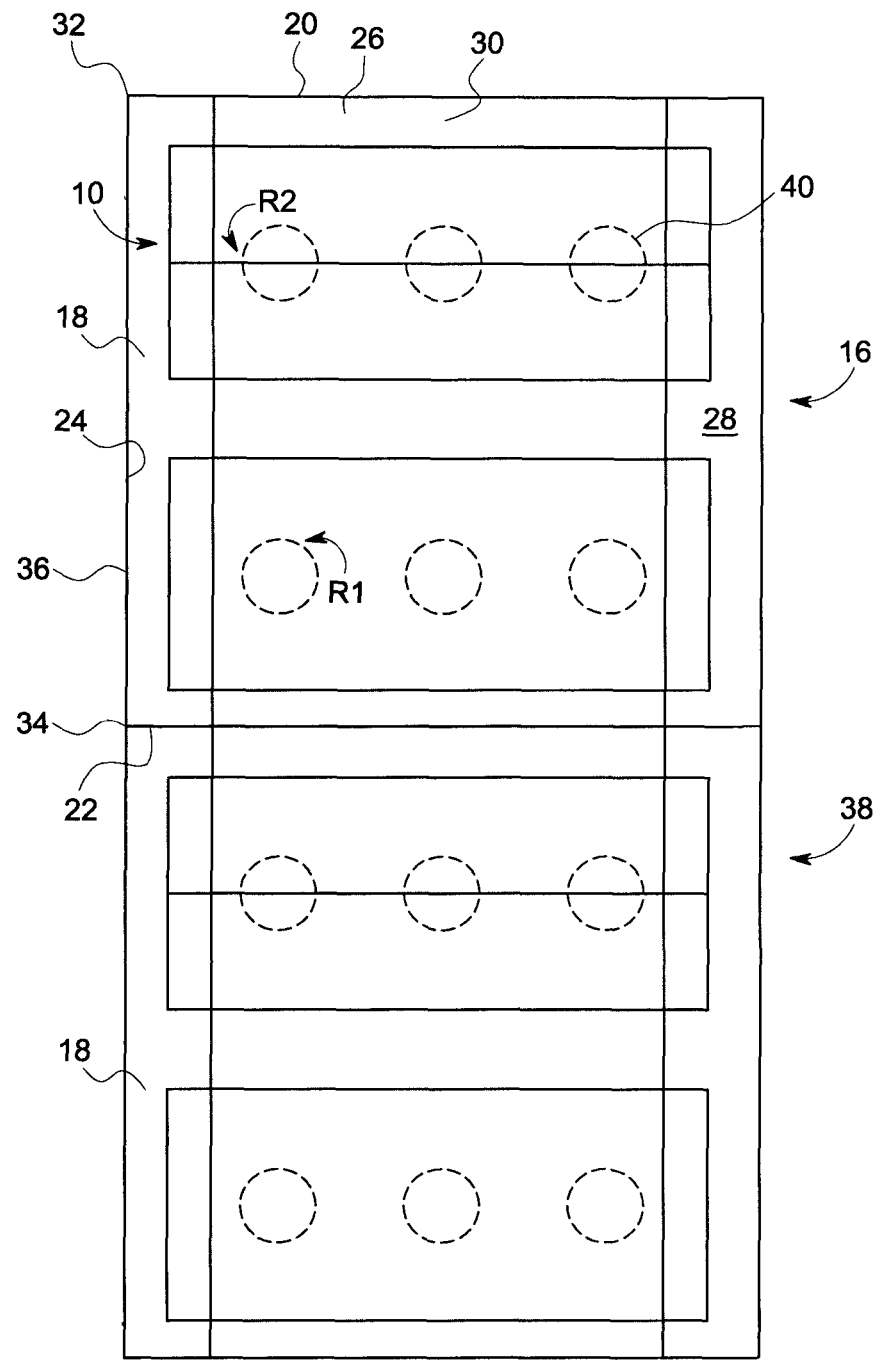
FIG. 2 illustrates another front view of switchgear and shutter assembly shown in FIG. 1 coupled to switchgear and including the shutter assembly orientated in a second position.

FIG. 1 illustrates a front view of a switchgear 10 and an exemplary shutter assembly 12 and including shutter assembly 12 orientated in a first position 14. Shutter assembly 12 is shown in first position 14 which represents an operational state of switchgear 10. FIG. 2 illustrates another front view of switchgear 10 and shutter assembly 12 coupled to switchgear 10 and including shutter assembly 12 orientated in a second position 16. Shutter assembly 12 is shown in a second position 16 which represents a non-operational state of switchgear 10.

Switchgear 10 includes a housing 18 having a top 20, a bottom 22, and opposing sidewalls 24 connecting top 20 and bottom 22. Housing 18 further includes a back wall 26 coupled to top 20, bottom 22, and sidewalls 24. Housing 18 defines a cavity 28 therein. Back wall 26 includes an inner side 30 which is orientated to face cavity 28.

Each sidewall 24 includes a top end 32, a bottom end 34, and a side 36 connecting top end 32 and bottom end 34. The height of sidewall 24, as measured between top end 32 and bottom end 34, is less than or about equal to 950 mm (about 37 in.). In an embodiment, the height includes a range from about 250 mm (about 10 in.) to about 750 mm (about 30 in.) The width of top 20 and bottom 22 of housing 18, as measured between sidewalls 24, is less than or about equal to 950 mm. In an embodiment, the width of top 20 and bottom 22 of housing 18 includes a range from about 250 mm to about 750 mm. Sizing of top 20, bottom 22, and sidewalls 24 for housing 18 facilitates stacking a plurality of housings 18 in a space substantially similar to a space used by single, known switchgear housing (not shown). In the exemplary embodiment, top 20, bottom 22, and sidewalls 24 are sized and shaped to form a stacked configuration 38 of a pair of housings 18 within a space used by a single, conventional switchgear (not shown).

Back wall 26 includes at least one terminal aperture 40 defined through inner side 30. In the exemplary embodiment, back wall 26 includes a pair of rows R1, R2 of substantially horizontal terminal apertures 40 with each row R1, R2 having a plurality of terminal apertures 40. Rows R1, R2 of terminal apertures 40 are spaced from one another in a common vertical plane with terminal apertures 40 being laterally spaced from one another. Any number of rows and terminal apertures 40 can be used for operation of switchgear 10.

Figure 3:
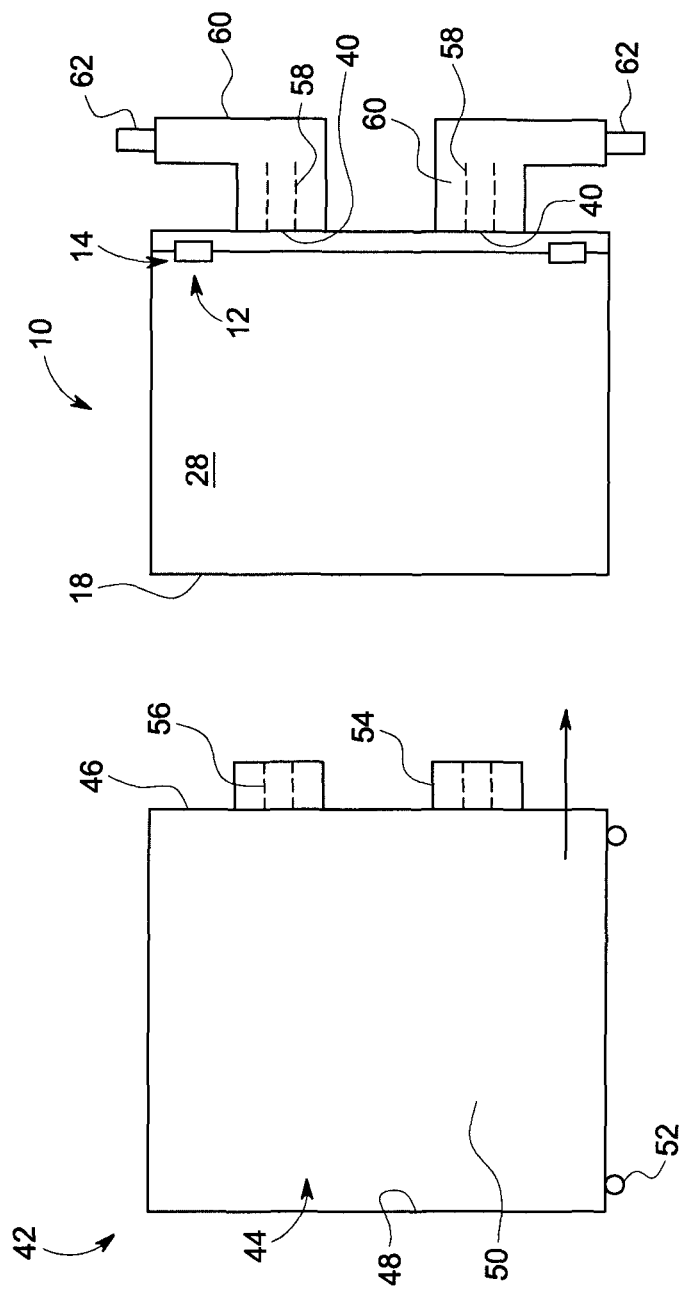
FIG. 3 illustrates a side elevational view of a circuit breaker that is positioned next to switchgear shown in FIG. 1.

FIG. 3 illustrates a side elevational view of a circuit breaker 42 that is positioned next to switchgear 10 (shown in FIG. 1). Circuit breaker 42 includes a housing 44 having a front side 46, a back side 48, and sidewalls 50 coupling front side 46 and back side 48. Sidewalls 50 include wheels 52 which are configured to move circuit breaker 42 in and out of cavity 28 when acted upon by a force (not shown). Circuit breaker 42 includes at least a pair of substantially horizontal insulating bushings 54, with bushings 54 of each pair being spaced from one another in a common vertical plane and with the different pairs of bushings 54 being laterally spaced from one another. An electrical contact 56 is disposed within each bushing 54. Bushings 54 are sized and shaped to facilitate coupling electrical contacts 56 of circuit breaker 42 to fixed electrical contacts 58 of switchgear 10.

Each terminal aperture 40 is sized, shaped and orientated to facilitate supporting an insulating tube 60. Fixed electrical contact 58 is disposed inside each insulating tube 60 mounted within respective terminal apertures 40. Each of the fixed electrical contacts 58 is electrically connected to a power conductor 62 which is electrically insulated by insulating tube 60.

Figure 4:
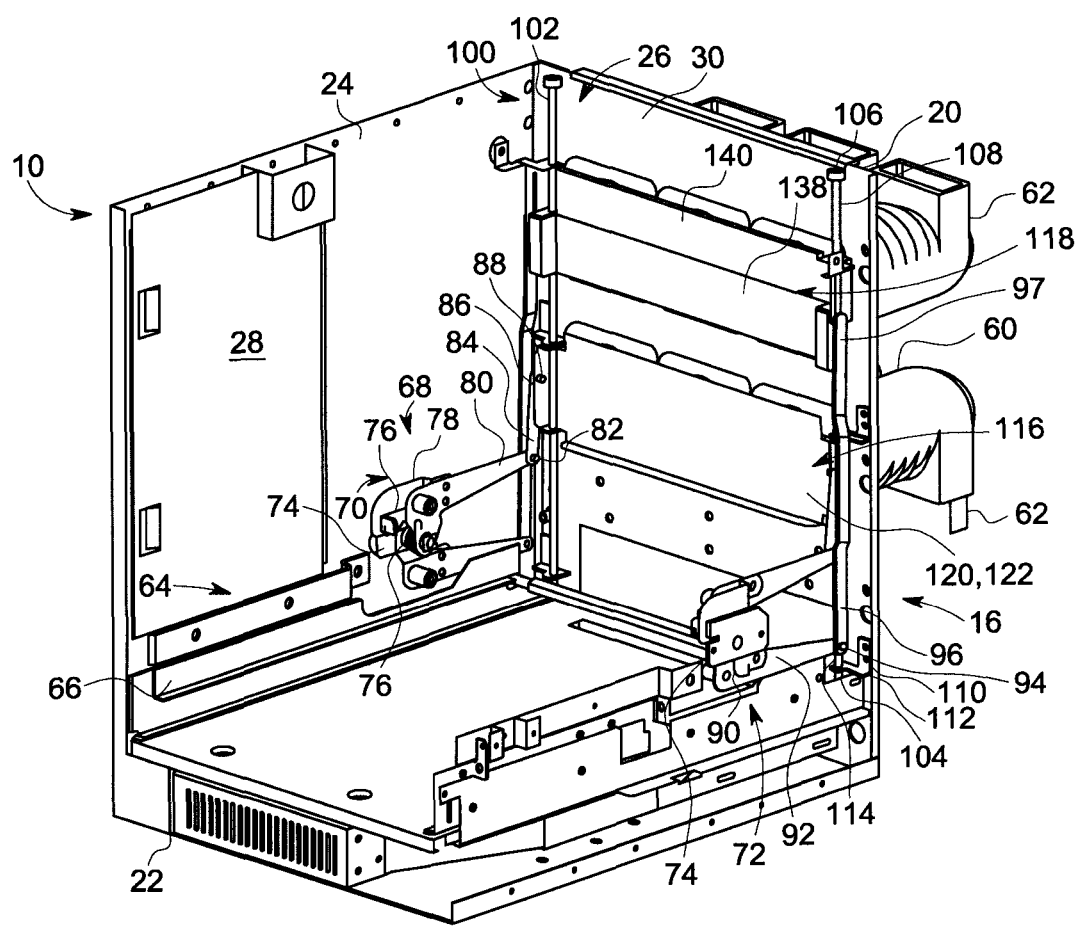
FIG. 4 illustrates a perspective view of the switchgear and including the shutter assembly shown in the second position.
Figure 5:
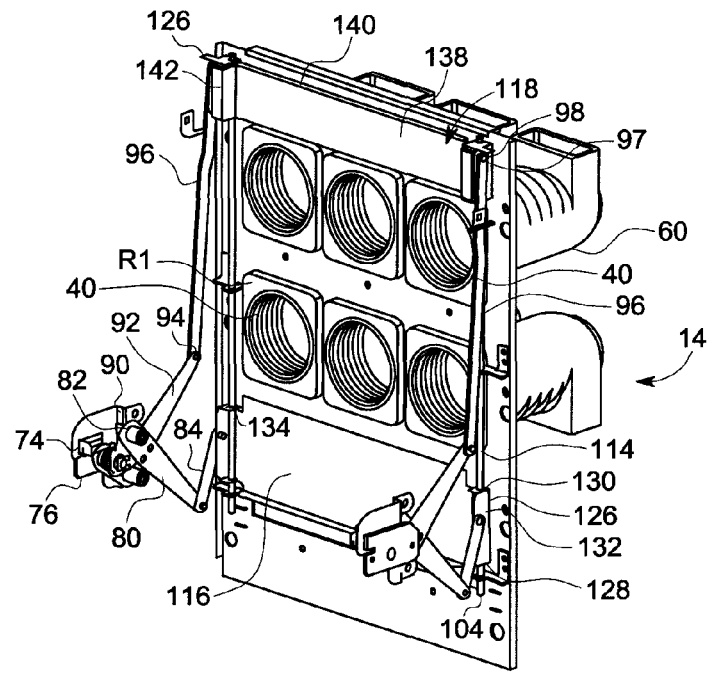
FIG. 5 illustrates another perspective view of the switchgear and shutter assembly shown in the first position.

FIG. 4 illustrates a perspective view of switchgear 10 and including shutter assembly 12 shown in second position 16. FIG. 5 illustrates another perspective view of the switchgear 10 and shutter assembly 12 shown in first position 14. In an embodiment, first position 14 is configured to expose at least one terminal aperture 40 to allow access to exposed terminal aperture 40. Further, in an embodiment, second position 16 is configured to cover at least one terminal aperture 40 to prevent access to covered terminal aperture 40. In first position 14 as described herein, shutter assembly 12 is configured to allow coupling of circuit breaker 42 to switchgear 10 for an operative state of switchgear 10. In second position 16 as described herein, shutter assembly 12 is configured to prevent coupling of circuit breaker 42 to switchgear 10.

Switchgear 10 further includes a track assembly 64 coupled to each sidewall 24 in a location proximate bottom 22 of housing 18. Track assembly 64 includes tracks or rails 66 located along each sidewall 24. Track assembly 64 couples to wheels 52 of circuit breaker 42 to facilitate reciprocally moving circuit breaker 42 in and out of housing cavity 28.

Switchgear 10 also includes a linkage assembly 68 coupled to each sidewall 24. Linkage assembly 68 is configured to facilitate operating shutter assembly 12 during the operational state of switchgear 10. Linkage assembly 68 includes a first bracket assembly 70, a second bracket assembly 72, an actuator member 74 and a bias member 76. Actuator member 74 couples to first bracket assembly 70 and second bracket assembly 72. Actuator member 74 is configured to convert linear motion of circuit breaker 42 moving along rails 66 to a rotational moment imparted to first bracket assembly 70 and second bracket assembly 72 as described herein. Bias member 76 is configured to move actuator member 74 when circuit breaker 42 removes force applied to actuator member 74. Any linkage assembly may be used to convert linear motion to rotational motion as described herein.

First bracket assembly 70 includes a linkage arm 78 coupled to actuator member 74. First bracket assembly 70 further includes a pivot arm 80 coupled to linkage arm 78. A first drive arm 84 pivotally couples to pivot arm 80 about pivot pin 82. First drive arm 84 includes an end 86 having a drive pin 88.

Second bracket assembly 72 includes a linkage arm 90 coupled to actuator member 74. Second bracket assembly 72 further includes a pivot arm 92 coupled to linkage arm 90. A second drive arm 96 pivotally couples to pivot arm 92 about pivot pin 94. Second drive arm 96 includes an end 97 having a pin aperture 98.

Switchgear 10 further includes a guide assembly 100 coupled to back wall 26. Guide assembly 100 includes a guide member 102 having a first end 104, a second end 106, and guide body 108 connecting first end 104 and second end 106. A plurality of supports 110 is configured to mount guide member 102 to back wall 26. Each support 110 includes a support aperture 112 which is sized and shaped to surround a portion of guide body 108. In an exemplary embodiment, supports 110 mount guide member 102 on back wall 26 substantially adjacent housing sidewall 24 to facilitate locating first end 104 proximate housing bottom 22 and second end 106 proximate housing top 20. Supports 110 can include any configuration to facilitate mounting guide body 108 to back wall 26.

Shutter assembly 12 is configured to couple with linkage assembly 68 and with guide assembly 100. Shutter assembly 12 is configured to reciprocally move between first position 14 and second position 16. In first position 14, shutter assembly 12 facilitates coupling circuit breaker 42 (FIG. 3) to electrical contacts 58 (FIG. 3) of switchgear 10. While in second position 16, shutter assembly 12 prevents access to electrical contacts 58 of switchgear 10.

Shutter assembly 12 includes a first shutter 116 and a second shutter 118. First shutter 116 is configured to prevent access to at least row R1 of terminal apertures 40 in second position 16 and to allow access to at least row R1 of terminal apertures 40 in first position 14. First shutter 116 includes a plate 120 having a front side 122 facing cavity 28 of housing 18 and having a rear side (not shown) facing back wall 26. Plate 120 has a size and shape to substantially prevent access to at least electrical terminal apertures 40 of row R1 of back wall 26.

Figure 6:
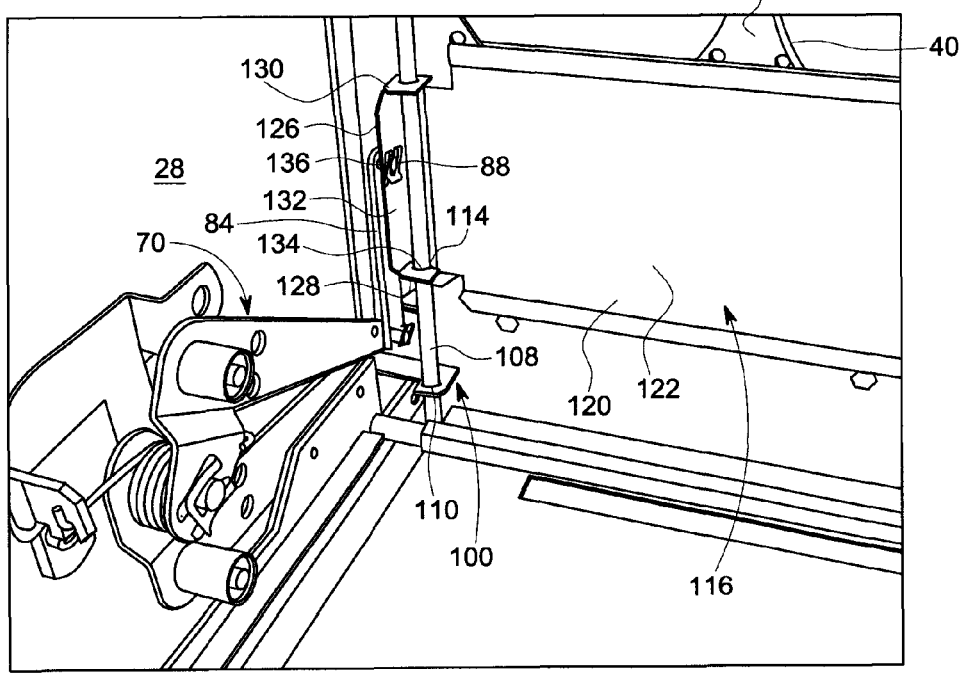
FIG. 6 is a front partial view of a first shutter of the shutter assembly shown in FIGS. 4 and 5.

FIG. 6 illustrates a front partial view of first shutter 116 of shutter assembly 12 shown in FIGS. 4 and 5. First shutter 116 further includes a flange 126 coupled to front side 122 and extending outward from front side 122 toward cavity 28 of housing 18. Flange 126 includes a first end 128, a second end 130, and sidewall 132 connecting first end 128 and second end 130. First end 128 and second end 130 include a guide aperture 134 defined therethrough. Guide aperture 134 is sized and shaped to slidably surround portions 114 of guide body 108 of guide assembly 100. Flange sidewalls 132 further include a pin aperture 136 defined therethrough. Pin aperture 136 is sized and shaped to accept and couple to drive pin 88 of first drive arm 84 for first bracket assembly 70.

In second position 16 as described herein, linkage assembly 68 is configured to move first shutter 116 to cover to terminal apertures 40 positioned in row R1. In second position 16, first shutter 116 is configured to facilitate preventing access to terminal apertures 40 of row R1. In first position 14 as described herein, linkage assembly 68 is configured to move first shutter 116 away from terminal apertures 40 of row R1 to expose terminal apertures 40. In first position 14, first shutter 116 is configured to facilitate allowing access to terminal apertures 40 of row R1.

Figure 7:
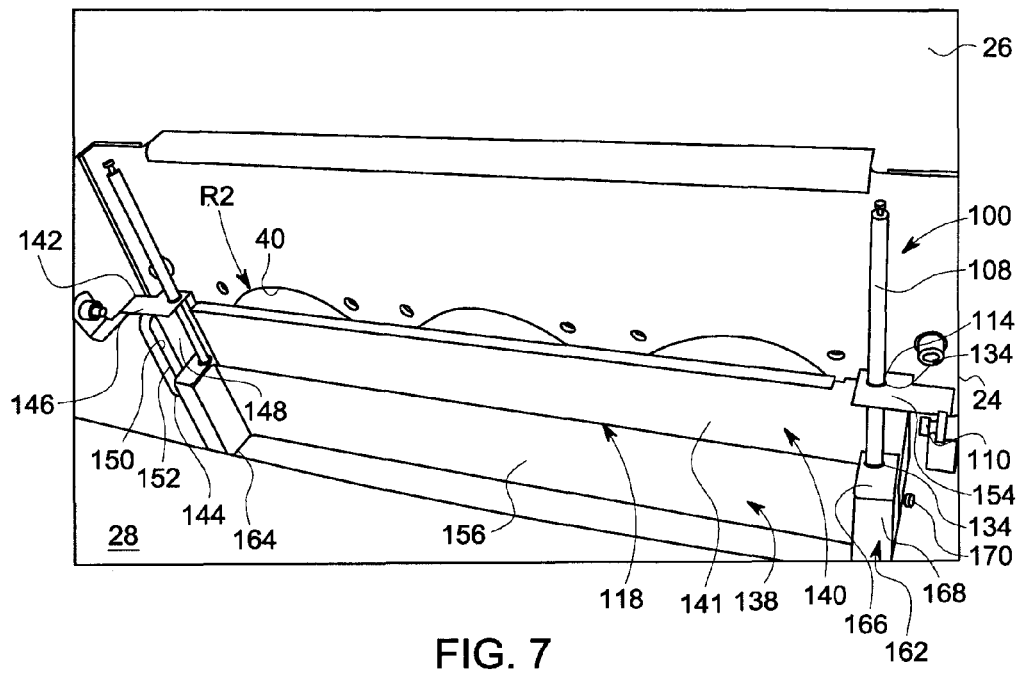
FIG. 7 is a front view of a second shutter of the shutter assembly shown in FIGS. 4 and 5.

FIG. 7 is a front view of a second shutter 118 of shutter assembly 12 shown in FIGS. 4 and 5. Second shutter 118 couples to linkage assembly 68 (shown in FIG. 4) and to guide assembly 100. Second shutter 118 is configured to prevent access to at least row R2 of terminal apertures 40 in second position 16 and to allow access to row R2 of terminal apertures 40 in first position 14. Second shutter 118 includes a lower plate 138 and an upper plate 140. Lower plate 138 is configured to reciprocally overlap and move upper plate 140 as described herein.

Upper plate 140 has a front side 141 facing cavity 28 of housing 18 and a rear side (not shown) facing back wall 26. Upper plate 140 includes an upper flange 142 coupled to front side 141 and extending outward toward housing cavity 28. Upper flange 142 includes a first end 144, a second end 146, and a sidewall 148 connecting first end 144 and second end 146. First end 144 and second end 146 include guide aperture 134 defined therethrough. Guide aperture 134 is sized and shaped to slidably surround portions 114 of guide body 108.

Sidewall 148 of upper flange 142 includes a slot 150 longitudinally located along axis 152 of flange 142. Slot 150 is located between first end 144 and second end 146. Upper flange 142 further includes a support arm 154 extending outward from and toward sidewall 24 of housing 18. In second position 16, support arm 154 is configured to contact and rest upon support 110 coupled to sidewall 24. Support 110, in second position 16, is configured to hold and suspend upper plate 140 along guide body 108. Upper plate 140 has a size and shape to substantially cover at least half of terminal apertures 40 of row R2 for back wall 26. In an embodiment, upper plate 140 is sized and shaped to cover at least upper portions of terminal apertures 40 of row R2. In the exemplary embodiment, upper plate 142 is sized and shaped to prevent access to at least upper portions of terminal apertures 40 of row R2.

Lower plate 138 has a front side 156 facing housing cavity 18 and a rear side (not shown) facing back wall 26. Lower plate 138 is configured to overlap upper plate 140 and move upper plate 140 in first position 14. Lower plate 138 includes a lower flange 162 coupled to front side 156 and extending outward toward housing cavity 28. Lower flange 162 includes a first end 164, a second end 166, and a sidewall 168 connecting first end 164 and second end 166. First end 164 and second end 166 include a guide aperture 134 defined therethrough. Guide aperture 134 is sized and shaped to slidably surround portions 114 of guide body 108.

Sidewall 168 of lower flange 162 includes slot pin 170 extending outward from sidewall 168 and toward sidewall 24 of housing 18. A fastener (not shown) secures slot pin 170 to lower flange 162. In an exemplary embodiment, fastener includes a clip. Any fastener to secure slot pin 170 to flange 162 can be used as described herein. Slot pin 170 couples to second drive arm 96 (shown in FIG. 4) of second bracket assembly 72. Slot pin 170 is sized and shaped to facilitate extending through slot 150 of upper plate 140 and rests upon upper flange 142 of upper plate 140 in second position 16. Lower plate 138 has a size and shape to substantially cover at least half of electrical terminal apertures 40 of row R2 for back wall 26. In an exemplary embodiment, lower plate 138 is sized and shaped to cover at least lower portions of terminal apertures 40 of row R2. In the exemplary embodiment, lower plate 138 is sized and shaped to prevent access to at least lower portions of terminal apertures 40 of row R2.

In second position 16 as described herein, linkage assembly 68 is configured to move second shutter 118 to cover terminal apertures 40 positioned in row R2. In second position 16, second shutter 118 is configured to facilitate preventing access to terminal apertures 40 of row R2. In first position 14 as described herein, linkage assembly 68 is configured to move second shutter 118 away from terminal apertures 40 of row R2 to expose terminal apertures 40. In first position 14, second shutter 118 is configured to facilitate allowing access to terminal apertures 40 of row R2. In the exemplary embodiment, lower plate 138 is configured to substantially overlap upper plate 140 in first position 14.

Since lower plate 138 is sized, shaped, and orientated to facilitate overlapping upper plate 140 and moving along guide body 108 with upper plate 140, less space is needed above terminal apertures 40 of row R2 to locate lower plate 138 and upper plate 140 in first position 14. In the exemplary embodiment, the overlap configuration of lower plate 138 and upper plate 140 reduces about one half the space of back wall 26 above terminal apertures 40 of row R2 as compared to the space of back wall 26 that is below terminal apertures 40 of row R1. Accordingly, the size of housing 18 is reduced to facilitate the compact, multi-tiered/stacked switchgear configuration 38 (shown in FIG. 1).

In an exemplary operation of switchgear 10, circuit breaker 42 is moved into housing cavity 28. Wheels 52 of circuit breaker 42 facilitate moving circuit breaker 42 on rails 66 to facilitate front side 46 of circuit breaker 42 contacting actuator member 74 of linkage assembly 68. Actuator member 74 is configured to facilitate moving linkage arm 78 of first bracket assembly 70. Linkage arm 78 of first bracket assembly 70 in response to movement rotates first drive arm 84 about pivot pin 82. In the exemplary embodiment, linkage arm 78 rotates downward to move first drive arm 84 downward.

First drive arm 84, which is coupled to first shutter plate 120 via drive pin 88, is configured to slide first shutter plate 120 downward along guide body 108 and away from terminal apertures 40 of row R1. Drive pin 88 moves first shutter plate 120 proximate housing bottom 22 to expose terminal apertures 40 of row R1 in first position 14. The sizes of first drive arm 84 and first shutter plate 120 locate the first shutter plate 120 between bottom 22 of housing 18 and terminal apertures 40 of row R1. In first position 14, electrical contacts 56 of circuit breaker 42 are exposed to electrical contacts 58 within insulating tubes 60. Circuit breaker 42 continues to move toward electrical contacts 58 of switchgear 10 to couple to electrical contacts 58 during the operational state of switchgear 10.

While circuit breaker 42 moves into housing 18, actuator arm 74 is configured to facilitate moving linkage arm 90 of second bracket assembly 72. Linkage arm 90, in response to movement, rotates second drive arm 96 about pivot pin 94. In the exemplary embodiment, linkage arm 90 rotates upward to move second drive arm 96 upward. Second drive arm 96, which is coupled to second shutter 118 at slot pin 170, slides lower plate 138 upward along guide body 108 and away from terminal apertures 40 of row R2.

Second drive arm 96 further moves slot pin 170 within slot 150 of upper flange 142 of upper plate 140. As slot pin 170 moves within slot 150, lower plate 138 is configured to move upward and substantially overlap upper plate 140. Additionally, as lower plate 138 substantially overlaps upper plate 140, lower flange 162 on the lower plate 138 contacts flange upper 142 of upper plate 140. Second drive arm 96 continues to move lower plate 138 to facilitate lifting upper flange 142 of upper plate 140 off of support 110. Second drive arm 96 moves lower plate 138 to at least partially overlap upper plate 140 and move lower plate 138 and upper plate 140 beyond terminal apertures 40.

Second drive arm 96 is sized to position upper plate 140 and lower plate 138 in the overlap position above terminal apertures 40 and below top 20 of housing 18 to expose terminal apertures 40. In the first position 14, upper electrical contacts 56 of circuit breaker 42 are exposed to electrical contacts 58 within insulating tubes 60. Circuit breaker 42 continues to move toward electrical contacts 58 of switchgear 10 to couple to electrical contacts 58 during the operational state of switchgear 10.

In an exemplary inoperative state of switchgear 10, circuit breaker 42 is disconnected and moved away from electrical contacts 58 along rails 66 to disconnect electrical contacts 56 of circuit breaker 42 from electrical contacts 58 of switchgear 10. When circuit breaker 42 moves away from back wall 26, circuit breaker 42 removes pressure applied to actuator arm 74 of linkage assembly 68. Bias member 76 is configured to pressure actuator arm 74 to facilitate moving actuator arm 74 away from back wall 26 to facilitate reverse operation of linkage assembly 68. Actuator arm 74 rotates linkage arm 78 of first bracket assembly 70 upward around pivot pin 82 which moves first drive arm 84 upward. Plate 120 of first shutter 116 is configured to slide upward along guide body 108 and in front of terminal apertures 40 of row R1. In the second position 16, plate 120 facilitates preventing access to electrical contacts 58 to facilitate minimizing or eliminating exposure to electrical contacts 58 and/or arcing from electrical contacts 58 of switchgear 10.

When circuit breaker 42 is disconnected and moved away from electrical contacts 58, actuator arm 74 further rotates linkage arm 90 of second bracket assembly 72 downward around pivot pin 94 which moves second drive arm 96 downward. Second drive arm 96 through slot pin 170 slides lower plate 138 downward along guide body 108. Slot pin 170 moves downward within slot 150 of upper plate 140. Since upper flange 142 of upper plate 140 rests on lower flange 162 of lower plate 138 in the first position 14, upper plate 140 moves downward with lower plate 138 until upper flange 142 of upper plate 140 contacts support 110 coupled to sidewall 24. Support 110 contacts support arm 154 to stop and support upper plate 140 in a position to at least partially cover terminal apertures 40 of row R2. In an exemplary embodiment, upper plate 140 substantially covers at least upper portions of terminal apertures 40 of row R2. In the exemplary embodiment, upper plate 140 is configured to prevent access to at least terminal apertures 40 of row R2.

While support 110 suspends upper plate 140 to at least partially cover terminal apertures 40 of row R1, second drive arm 96 continues to rotate to lower plate 138 through coupling with slot pin 170. Slot pin 170 moves downward within slot 150 of upper flange 142 of upper plate 140 to facilitate moving lower plate 138 in position to at least partially cover terminal apertures 40 of row R2. Slot pin 170 rests on bottom of slot 150 to suspend lower plate 138 in the second position 16. In an embodiment, lower plate 138 substantially covers lowers portions of terminal apertures 40 of row R2. In the exemplary embodiment, lower plate 138 is configured to prevent access to at least terminal apertures 40 of row R2.

Figure 9:
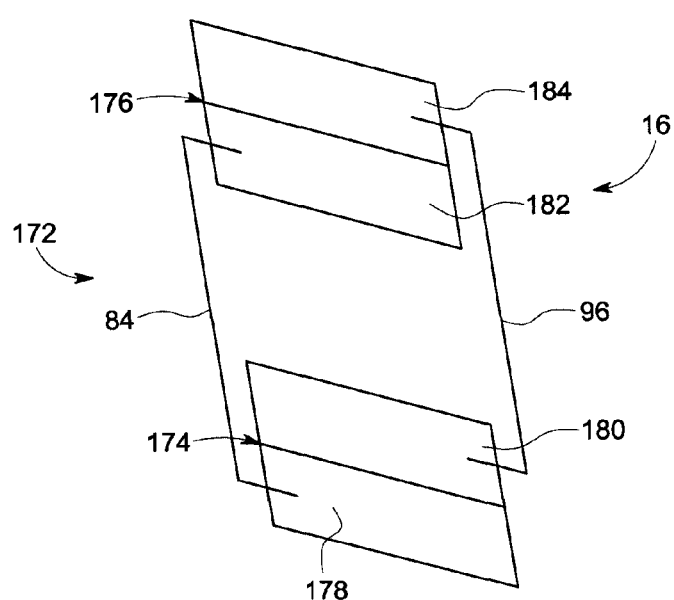
FIG. 9 illustrates another schematic view of the shutter assembly shown in FIG. 8 and shown in the second position.
Figure 8:
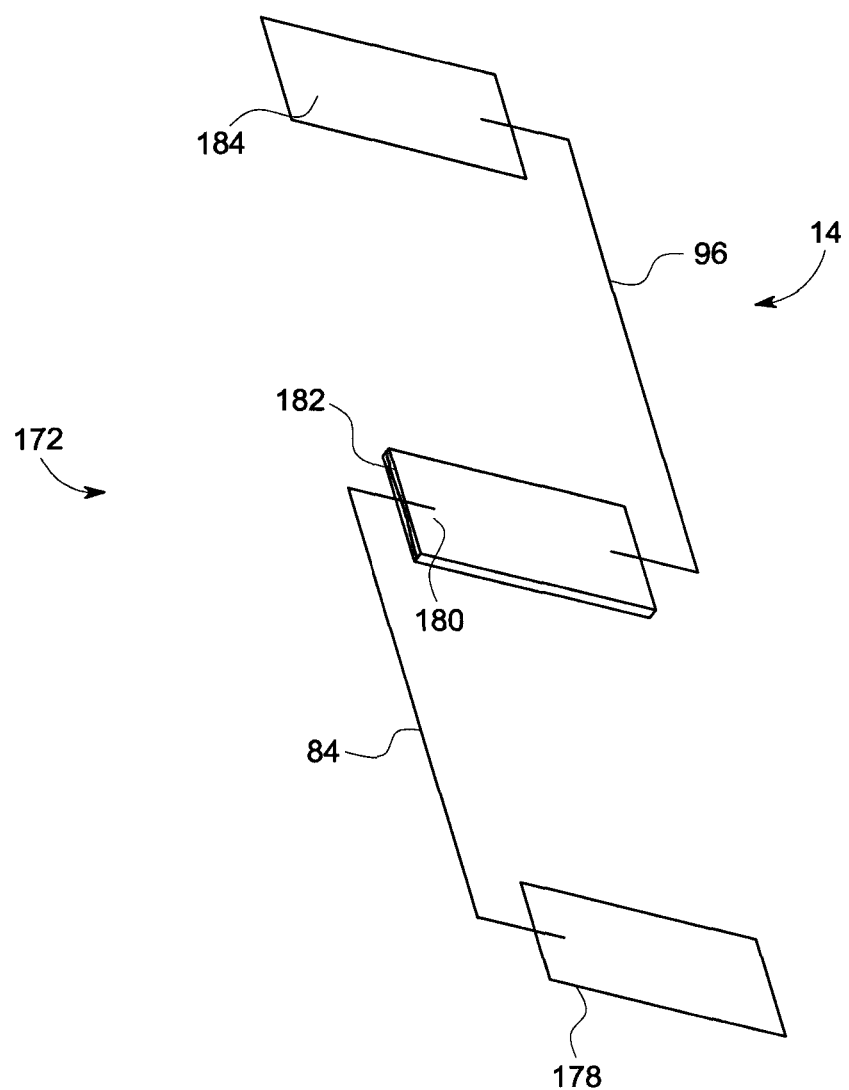
FIG. 8 illustrates a schematic view of another exemplary shutter assembly shown in the first position.

FIG. 8 illustrates a schematic view of another exemplary shutter assembly 172 shown in first position 14. FIG. 9 illustrates another schematic view of shutter assembly 172 shown in second position 16. Shutter assembly 172 includes a first shutter 174 and a second shutter 176. First shutter 174 includes a lower plate 178 and an upper plate 180. Second shutter 176 includes a lower plate 182 and an upper plate 184.

First drive arm 84 of first bracket assembly 70 (shown in FIG. 2) is configured to couple to lower plate 178 and lower plate 182. Second drive arm 96 of second bracket assembly 72 (shown in FIG. 2) is configured to couple to upper plate 180 and upper plate 184. During the operational state of switchgear 10 first drive arm 84 moves lower plates 178, 180 into first position 14 and second drive arm 96 moves upper plates 180, 184 into first position 14. In first position 14, lower plate 182 of second shutter 176 is configured to overlap upper plate 180 of first shutter 174. The traveling distances for first shutter 174 and second shutter 176 to first position 14 is reduced by the overlapping plates 180, 182 to facilitate reducing the size of the switchgear housing (not shown).

Figure 10:
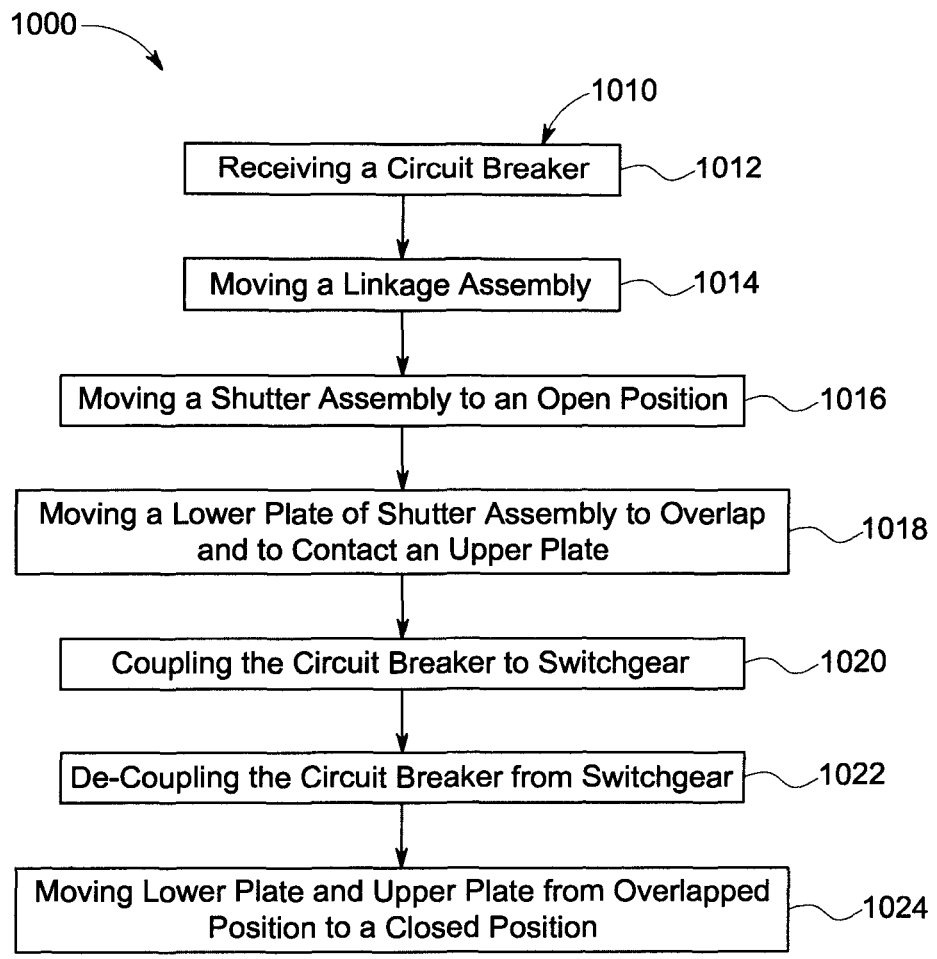
FIG. 10 is an exemplary flowchart illustrating a method of controlling access to the switchgear shown in FIG. 1.

FIG. 10 is an exemplary flowchart 1000 illustrating a method 1010 of controlling access to a switchgear, for example switchgear 10 (shown in FIG. 1) during an operational state and a non-operational state. Method 1010 includes receiving 1012 a circuit breaker, for example circuit breaker 42 (shown in FIG. 3) and moving 1014 a linkage assembly, for example linkage assembly 68 (shown in FIG. 4). Linkage assembly moves 1016 a shutter assembly, such as shutter assembly 12 (shown in FIG. 4) to a first position, for example first position 14 (shown in FIG. 6). In first position 14, electrical contacts of switchgear are exposed for coupling to circuit breaker. In the exemplary embodiment, moving shutter assembly includes moving 1018 a lower plate, for example lower plate 138 (shown in FIG. 5), to overlap and to contact an upper plate, for example upper plate 140 (shown in FIG. 5). Method 110 includes moving lower plate/upper plate to an overlapped position to expose electrical contacts of switchgear. Circuit breaker is coupled 1020 to switchgear during the operational state of switchgear.

Method 110 further includes de-coupling 1022 circuit breaker from electrical contacts and removing circuit breaker from switchgear. Linkage assembly, in response to the removal of the circuit breaker, moves shutter assembly to the second position. In the exemplary embodiment, method includes moving 1024 lower plate/upper plate from the overlapped position to the second position, such as second position 16 (shown in FIG. 4) to cover electrical contacts of switchgear, such as switchgear 10. In the second position, shutter assembly prevents access to electrical contacts of switchgear.

The embodiments described herein provide a protective device for a switchgear. The disclosed dimensions include all sub ranges therebetween. The dimensions facilitate reducing the size of the housing for switchgear. The protective device can be used for new manufacture of switchgears or for integration with existing switchgears. In one embodiment, the protective device includes an overlapping shutter configured to move along the switchgear. The overlapping shutter reciprocates between an first position to facilitate exposing electrical contacts of the switchgear and a second position to facilitate preventing access to the electrical contacts. The overlapping shutter provides more efficient and effective shutter designs to prevent access to any live parts to facilitate minimizing or eliminating arcing. Further, the overlapping shutter reduces the size of the switchgear housing.

A technical effect of the system described herein is that the overlapping shutter reciprocates between an first position to facilitate exposing electrical contacts of the switchgear and a second position to facilitate preventing access to the electrical contacts. Another technical effect of the overlapping shutter provides more shutter designs to minimize or prevent access to live parts to facilitate minimizing or eliminating arcing while reducing the size of the switchgear housing.

Exemplary embodiments of the protective device and methods of preventing access to the switchgear are described above in detail. The protective device and methods are not limited to the specific embodiments described herein, but rather, components of the protective device and/or the switchgear and/or steps of the method may be utilized independently and separately from other components and/or steps described herein. For example, the protective device and methods may also be used in combination with other power systems and methods, and are not limited to practice with only the electrical system as described herein. Rather, the exemplary embodiments can be implemented and utilized in connection with many other electrical applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A protective device for exposing and preventing access to electrical contacts within a switchgear housing, the device comprising:
   a linkage assembly coupled to the housing, said linkage assembly comprising a first drive arm and a second drive arm;
   a guide assembly coupled to the housing, said guide assembly comprising a first end, a second end and a guide body connecting said first end and said second end;
   a first shutter and a second shutter, said first and second shutters selectively moveable between a respective first position which is configured to expose the electrical contacts and a respective second position which is configured to prevent access to the electrical contacts,
   said first shutter coupled to said first drive arm of said linkage assembly and coupled to said guide body of said guide assembly, said first shutter is configured to selectively move along said guide body; and
   said second shutter comprising a lower plate and an upper plate,
   said lower plate coupled to said second drive arm, said lower plate and said upper plate coupled to said guide body, and configured to selectively move along said guide body between said first and said second positions wherein said lower plate is configured to at least partially overlap said upper plate when said second shutter is in said first position.

2. The protective device of claim 1, wherein said lower plate is slidably coupled to said upper plate.

3. The protective device of claim 1, wherein said lower plate and said upper plate are slidably coupled to said guide body.

4. The protective device of claim 1, wherein said lower plate is located below said upper plate when said second shutter is in said second position.

5. The protective device of claim 1, wherein said lower plate is configured to move said upper plate toward said first position.

6. The protective device of claim 1, wherein said lower plate comprises a lower flange and said upper plate comprises an upper flange, said lower flange is configured to couple to said upper flange when said upper plate and lower plate are selectively moved to said first position.

7. The protective device of claim 6, wherein said lower flange is configured to de-couple from said upper flange when said lower plate and said upper plate are selectively moved to said second position.

8. The protective device of claim 6, wherein said upper flange of said upper plate comprises a slot.

9. The protective device of claim 8, wherein said upper flange of said lower plate comprises a pin that is configured to slidably couple to said slot.

10. The protective device of claim 1 wherein said first shutter comprises a lower plate and an upper plate.

11. The protective device of claim 5 wherein said upper plate is coupled to said first drive arm of said linkage assembly.

12. A switchgear device comprising:
    a housing having a top, a bottom, a sidewall and a back wall coupling said top and said bottom, said back wall comprising a plurality of terminal apertures defined therethrough;
    a linkage assembly coupled to the housing, said linkage assembly comprising a first drive arm and a second drive arm;
    a guide assembly coupled to the housing, said guide assembly comprising a first end, a second end and a guide body connecting said first end and said second end;
    a first shutter and a second shutter, said first and second shutters selectively moveable between a respective first position which is configured to expose the electrical contacts and a respective second position which is configured to prevent access to the electrical contacts,
    said first shutter coupled to said first drive arm of said linkage assembly and coupled to said guide body of said guide assembly, said first shutter is configured to selectively move along said guide body; and
    said second shutter comprising a lower plate and an upper plate, said lower plate coupled to said second drive arm, said lower plate and said upper plate coupled to said guide body, and configured to selectively move along said guide body between said first and said second positions wherein said lower plate is configured to at least partially overlap said upper plate when said second shutter is in said first position.

13. The switchgear device of claim 12, wherein at least one of said upper plate and said lower plate has a height less than a height of said first shutter.

14. The switchgear device of claim 12, wherein said upper plate and said lower plate are substantially similar in height.

15. The switchgear device of claim 12, wherein said lower plate is configured to at least partially overlap said upper plate when said lower plate and said upper plate are selectively moved to said first position.

16. The switchgear device of claim 12, wherein said upper plate comprises a slot and said lower plate includes a pin that is configured to slidably couple to said slot.

17. The switchgear device of claim 16, wherein said pin is coupled to said linkage assembly.

18. The protective device of claim 12, wherein said lower plate is located below said upper plate when said second shutter is in said second position.

19. The protective device of claim 12, wherein said lower plate is configured to move said upper plate toward said first position.

20. The protective device of claim 19 wherein said upper plate is coupled to said first drive arm of said linkage assembly.

* * * * *